Oct. 27, 1953

W. E. HINES 2,656,662

TRACTOR MOUNTED STALK SHREDDING DEVICE

Filed Jan. 16, 1951

INVENTOR:
Walter E. Hines,
BY Cushman, Darby & Cushman
ATTORNEYS

Oct. 27, 1953 W. E. HINES 2,656,662
TRACTOR MOUNTED STALK SHREDDING DEVICE
Filed Jan. 16, 1951 3 Sheets-Sheet 2
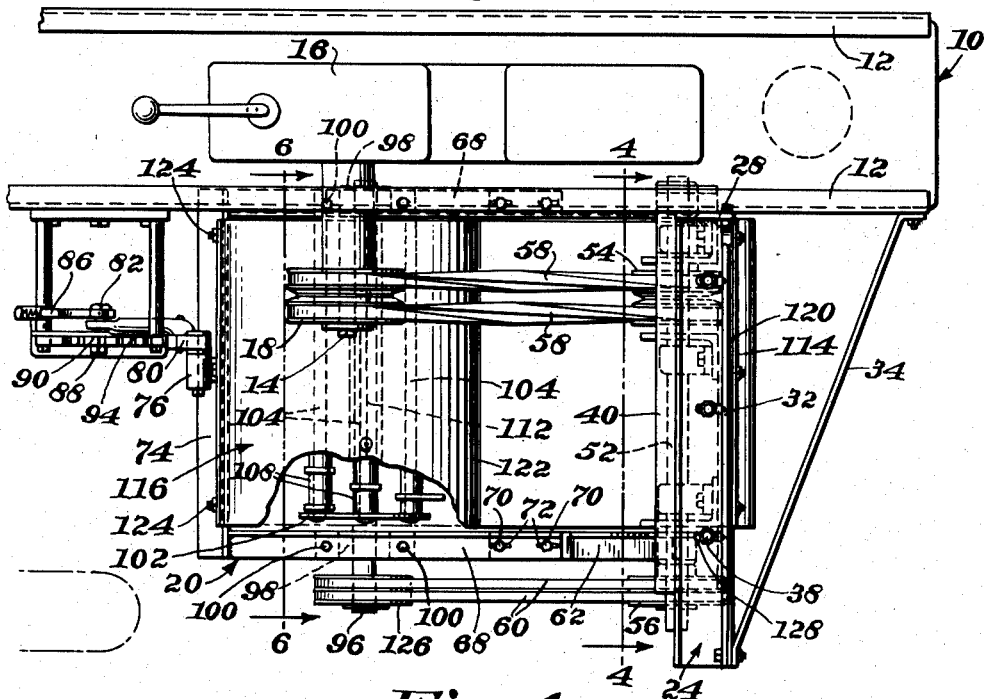
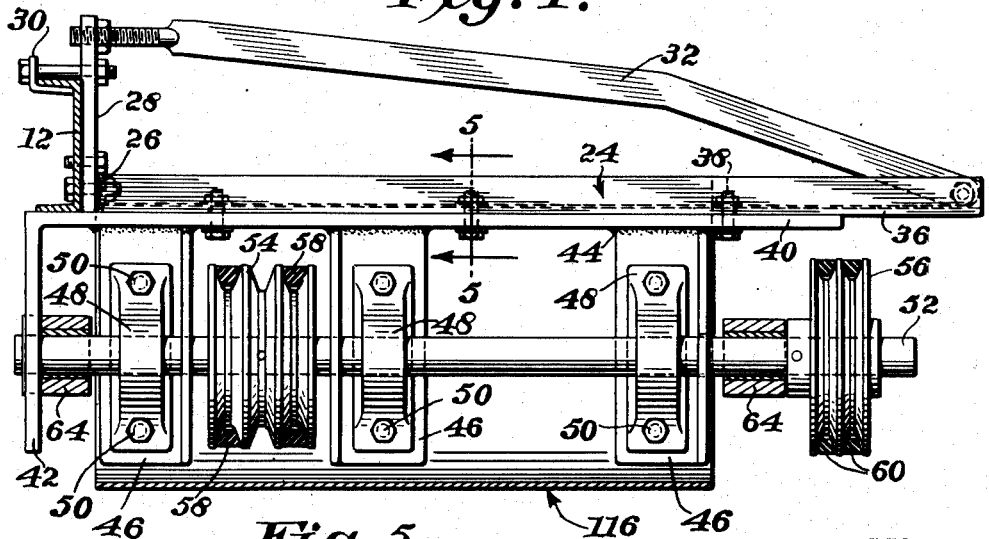
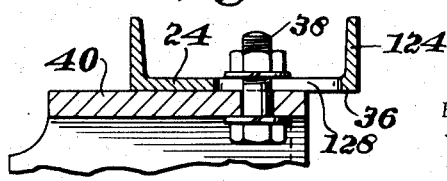
INVENTOR:
Walter E. Hines,
BY Cushman, Darby & Cushman
ATTORNEYS.

Oct. 27, 1953     W. E. HINES     2,656,662
TRACTOR MOUNTED STALK SHREDDING DEVICE
Filed Jan. 16, 1951     3 Sheets-Sheet 3
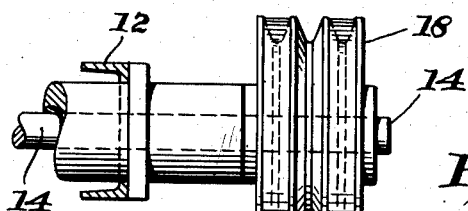
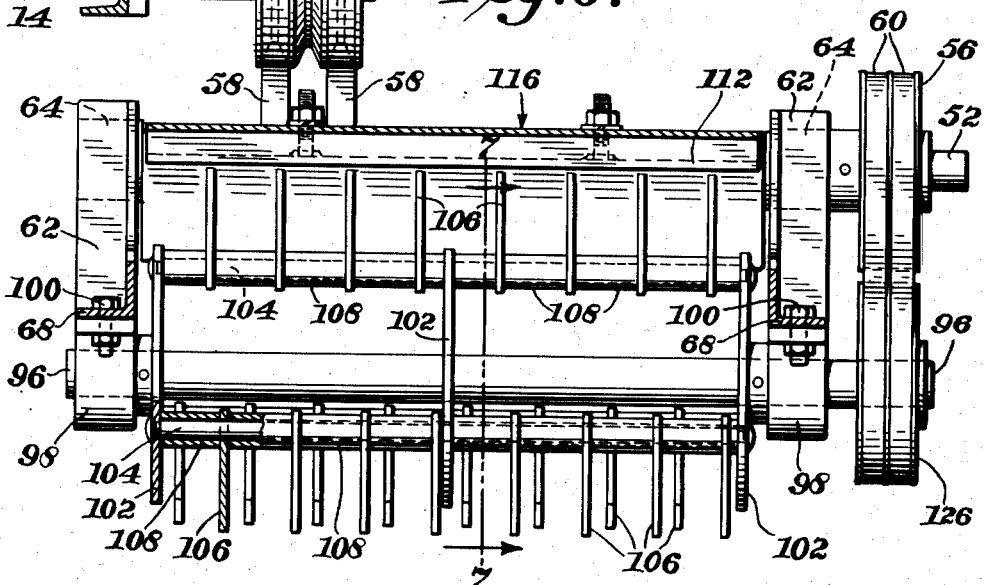
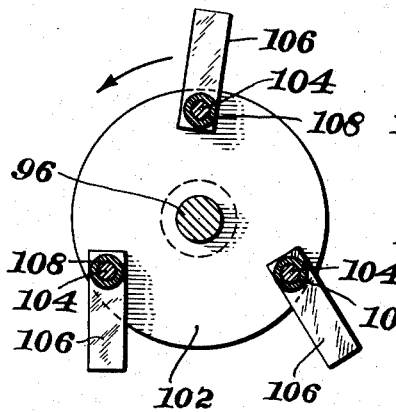
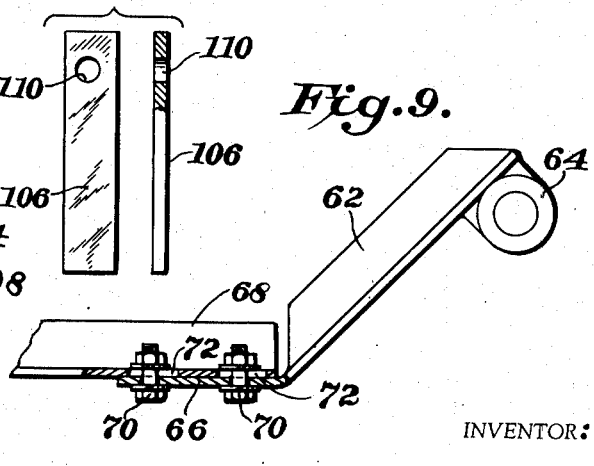
INVENTOR:
Walter E. Hines,
BY Cushman, Darby & Cushman
ATTORNEYS.

Patented Oct. 27, 1953

2,656,662

UNITED STATES PATENT OFFICE 2,656,662

TRACTOR MOUNTED STALK SHREDDING DEVICE

Walter E. Hines, Fredericktown, Ohio

Application January 16, 1951, Serial No. 206,234

10 Claims. (Cl. 55—118)

This invention relates to a stalk shredding device. More particularly it relates to a stalk shredding attachment adapted to be carried and supported by a tractor or other farm vehicle and to receive its power from the same.

It is known in the art that shredding of cornstalks or other vegetable growth remaining in the field after harvesting is desirable not only for the purpose of providing a mulch or fertilizer for the next crop but also for the purpose of destroying the corn borer present in the stalks. In addition, shredding permits easy tilling of the soil for planting the next crop and, therefore, does away with the usual required removal of the stalks by some other means.

It is a principal object of this invention, therefore, to provide an improved mechanical means for thoroughly shredding corn or other vegetable material and then distributing the same over the surface of the soil so that the humus value of the stalks is not lost and various insects and fungi are destroyed.

A further object of this invention is to provide a stalk shredder as aforesaid which may be carried and completely supported by a tractor or other farm vehicle and driven by a power take-off of the same.

A still further object of this invention is to provide a stalk shredding device which is manually adjustable in its vertical position relative to the ground so that it may be utilized over continually changing contours of the same.

Another object of this invention is to provide a stalk shredder comprising a flail or beater rotor having a plurality of flails or beaters pivotally mounted about its periphery for cooperating with a stationary knife edge mounted in substantial contact with the periphery described by the free ends of the rotating beating or flailing elements. This arrangement permits an unusually effective shredding action.

Another object of this invention is to provide a flail or beater rotor having a plurality of pivotally mounted flailing or beating elements as aforesaid which, due to their offset mounting, provide a greater impetus at the point of final shredding than normally arranged for.

Other and further objects of this invention will become apparent from the following description taken in connection with the drawings wherein:

Figure 3 is a top plan view, partially broken away, of Figure 1 and schematically showing only a portion of the tractor;

Figure 4 is an enlarged vertical cross-sectional view taken substantially along the line 4—4 of Figure 3;

Figure 5 is an enlarged fragmental vertical cross-sectional view taken along the line 5—5 of Figure 4;

Figure 6 is an enlarged vertical cross-sectional view taken along the line 6—6 of Figure 3 and partially broken away to show the mounting of the flailing or beating elements;

Figure 7 is a vertical cross-sectional view taken along the line 7—7 of Figure 6;

Figure 8 is an enlarged detailed plan and edge view showing the construction of a single beating element, the edge view being shown partially in cross section; and Figure 9 is a detailed view partially in cross section and enlarged for the purpose of showing the adjustable belt tightening arrangement of the length of the stalk shredder frame and the pivotal mounting for the forward end thereof.

Figure 1:
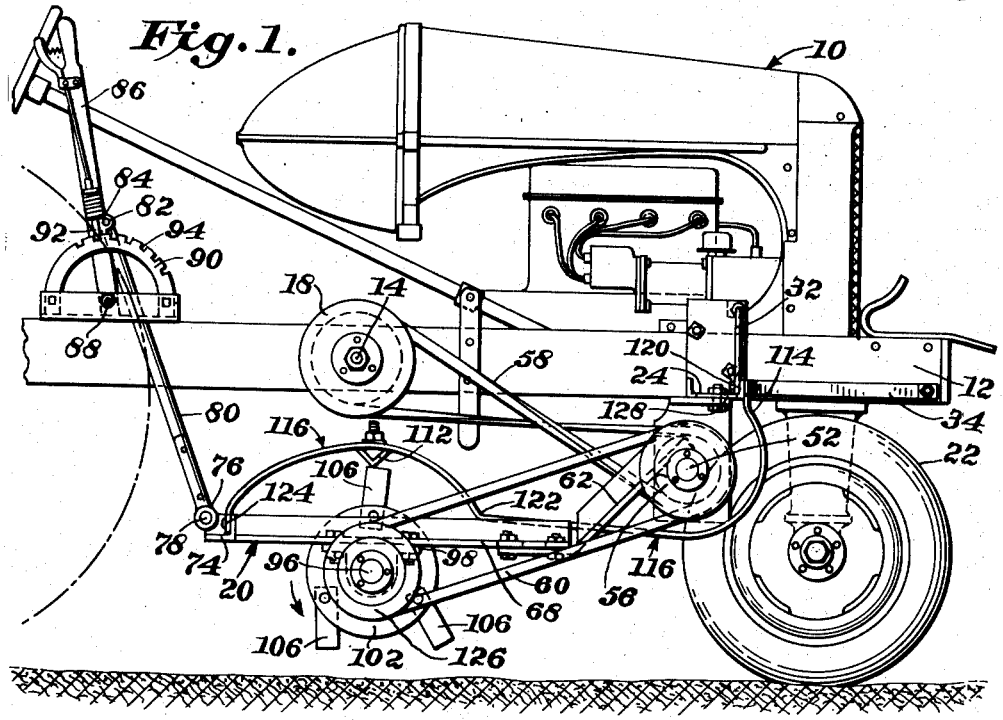
Figure 1 is a side elevational view of the stalk shredder of this invention mounted on the side of a tractor.
Figure 2:
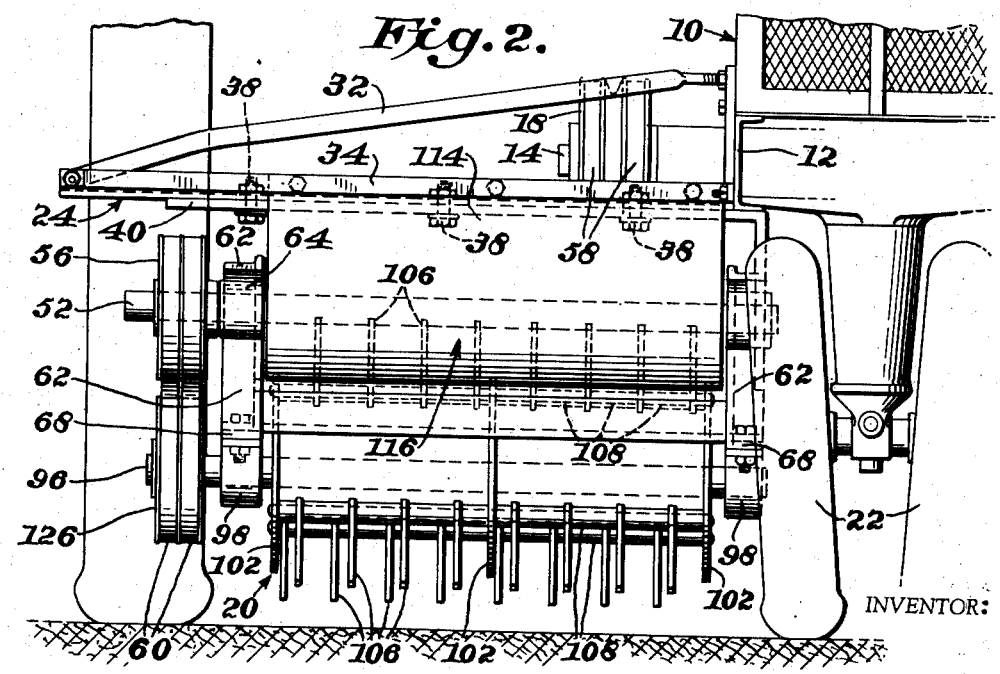
Figure 2 is an enlarged front end view of Figure 1 showing only a portion of the tractor.

Referring to the drawings in which like numerals indicate like parts in the several views, 10 designates a conventional tractor having longitudinal side chassis frame channel members 12. A power takeoff shaft 14 extending from the transmission 16 of the tractor 10 carries a power takeoff double pulley 18 for driving the stalk shredder generally indicated as 20 in a manner described hereinafter.

Supporting member 24 which, as shown, is preferably a channel member carries the forward end of stalk shredder 20 and extends laterally from the channel member 12 at a point rearwardly of the front tractor wheels 22. Plate member 28 is welded at 26 to member 24 for providing a lateral extension thereof. The lateral extension is in turn bolted to channel member 12. Additional supporting means is provided by the bolt and angle iron arrangement 30. Bracing struts 32 and 34 may be provided as shown for further support of member 24. This arrangement insures a stationary positioning of the supporting member 24 and also permits easy removal of the stalk shredder 20 from the tractor 10 when desired.

On the bottom side of the web 36 of the channel member 24 there is fastened by means of bolts 38 a plate 40 which has a lateral extending shaft supporting portion 42 on the inner end thereof. Welded to the bottom of plate 40 at 44 are three downwardly extending plates 46. Each of the plates 46 carries aligned bearing housings 48 bolted thereto by means of bolts 50. Extending through the bearing housings 48 and carried by the bearings therein is a driven shaft 52 which has fixed thereto a double belt pulley 54 and a double belt pulley 56. Shaft 52 is driven by means of endless belts 58 around double belt pulley 56 and double belt pulley 18. Endless belts 60 around double pulley 56 drive the rotor of the shredder 20 as hereinafter described.

Extending rearwardly and downwardly from shaft 52 from a point adjacent each of the outer ends thereof is a shredder frame member 62 which is pivotally carried by shaft 52 by means of bearing collars 64 (Figure 9). At the free end of each of the frame members 62 and extending rearwardly in a position substantially parallel to the ground is a support extension 66. Carried by each of the support members 66 is a shredder frame member 68 which extends rearwardly and is substantially parallel to the other. Bolts 70 are received in longitudinal slots 72 of member 68 and provide for extension of the length of the frame of the stalk shredder 20 for the purpose of tightening belts 60.

The rear ends of frame member 68 are joined by an end angle member 74 which, as shown, is welded thereto. At a point substantially midway between the ends of member 74 is provided a bearing housing member 76. A stub shaft 78 rotatably carried in the bearing of housing 76 has fixed at one end thereof a laterally extending linkage member 80. The other end of linkage member 80 is provided with a laterally extending stub shaft 82 which is received by the bearing in bearing housing 84 as best shown in Figure 1. The bearing housing 84 is carried by a manually operated lever 86 which is pivotally fixed at one end 88 thereof to the center of a rack 90. Detent means 92 of hand lever 86 engage the teeth 94 of the rack 90 in conventional manner.

Movement of the hand lever 86 to various positions on the rack 90 permits vertical adjustment of the rear end of the stalk shredder 20 and thereby provides for adjustment of the shredding device relative to the surface of the ground permitting the use of the shredder over changing contours of the surface of the ground.

A shaft 96 transverse to the frame members 68 and parallel to shaft 52 is rotatably supported by the bearings of bearing housings 98 which are bolted by means of bolts 100 to their respective frame members 68. Carried on shaft 96 and fixed thereto in spaced apart relationship between the bearing housings 98 are discs 102. Three rods 104 spaced apart by 120° are carried in aligned openings in the spaced apart discs 102. It is apparent that although three discs 102 and three rods 104 are shown that a different number may be used depending upon the size of the shredder 20 desired. Pivotally mounted on each of the rods 104 are a plurality of beating or flailing elements 106. These elements 106 are spaced apart one from the other on their individual rods by means of suitable collars or spacer rings 108. As best shown in Figure 6 of the drawings, the elements 106 which are mounted on separate rods 104 bear a staggered relationship one to the other so that the peripheral movement of the free ends of the elements 106 describes a continuous spiraling path. This feature is of importance since it assures a more effective beating or flailing action of the elements 106 as they travel by the cooperating angle iron 112 having a knife edge described hereinafter.

As shown in Figures 7 and 8, the pivotal mounting opening 110 of each of elements 106 is offset from the longitudinal central axis of its beating element in a direction towards the trailing edge of the element. The beater rotor which includes shaft 96, discs 102, and rods 104 rotates in a counterclockwise direction as viewed from Figure 1. This arrangement causes elements 106 to strike the stalks with greater impetus as the free end of element 106 passes close to the abovementioned angle iron 112 positioned vertically above shaft 96.

The forward end 114 of a guard which may be of sheet metal and is indicated generally as 116 is fixed to the forward leg 120 of channel member 24 by bolts or otherwise. This guard member 116 extends downwardly from end 114 and under the shaft and pulley arrangement designated by numerals 52, 54, and 56 and then rearwardly to the point 122 from which it extends upwardly above and around the periphery described by the free end of the beating elements 106 upon rotation of shaft 96 and is secured as at 124 to the vertical leg of angle member 74.

This arrangement prevents stalks in the field from fouling the rotation of shaft 52 and assures the flailing action of the beating elements 106 on the stalks as they pass through the shredder device.

Angle iron 112, which performs the function of a knife blade, is secured to the inner side of guard 116 vertically above shaft 96 adjacent the periphery described by the free ends of rotating beating elements 106 during rotation of the beater rotor. Provision may, of course, be made for adjustment of angle iron 112 in order to obtain optimum shredding action. Angle iron 112 assists materially in the thorough and complete shredding of the stalks and aids in the distribution of the shredded material as it is forced rearwardly out of shredder 20 and thence to the ground.

Shaft 96 which in the particular embodiment shown rotates at a speed of approximately 1500 R. P. M. is connected to the power takeoff shaft 14 through the described pulley and endless belt arrangement including endless belts 60 which drive the double pulley 126 attached to the outer free end of shaft 96.

By means of the slot 72 and bolts 70, endless belts 60 extending over pulleys 56 and 126 may be suitably tightened or loosened. In addition, slot 128 and bolt 38 permit adjustment of plate member 40 relative to channel member 24 and thereby provide suitable adjustment of the tension of endless belts 58. The adjusting means for raising and lowering the rearward end of the stalk shredder 20 for the purpose of conforming with the contour of the earth does not interfere with the proper tensioning of belts 60 since the pivotal movement of the frame of the shredder 20 is about the same axis of rotation as pulley 56.

In addition, it is apparent that the speed of rotation of the shredder may be made variable by the use of Reeves pulleys or other well known reduction means.

The beater rotor and beating elements 106 of this invention have been described for use in connection with a particular frame supporting means and a particular means for adjusting the height of the rotor relative to the ground. However, the improved beater rotor and beating elements may be used in other structures known in the prior art in lieu of the shredding rotors of these structures which are less effective for the purpose of shredding cornstalks or other vegetable growth.

Although the stalk shredder 20 of this invention has been described as carried by a tractor 10, it is apparent that any vehicle may be suitably arranged for supporting the same, such a vehicle being preferably self-propelled.

The foregoing description has been for the purpose of illustration only and is not limiting to the scope of the invention which is set forth in the claims wherein I claim:

1. A stalk shredding device of the type for attachment to a vehicle and driven by a power take off unit thereon comprising a supporting member adapted to be rigidly connected to the vehicle, a substantially horizontal drive shaft rotatably supported by said supporting member transverse to the longitudinal axis of the vehicle, said drive shaft adapted to be rotated by the power unit of the vehicle, a frame member pivotally journalled on said drive shaft and including two substantially parallel spaced apart side members extending rearwardly from said shaft, a beater rotor rotatably supported by said frame member between its side members and having an axis of rotation substantially parallel to said drive shaft, a plurality of rigid beating elements each pivotally mounted at one end thereof to said beater rotor on its periphery and having the other ends thereof free, each of said beating elements having a leading and a trailing edge, an angle iron mounted above said beater rotor and adjacent a periphery described by the free ends of the beating elements during rotation of said beater rotor, said angle iron extending transverse of said frame member and having a knife edge spaced from the free ends of said beating elements, means drivably connecting said drive shaft and beater rotor, and means connected to said frame member and operatively associated with the vehicle for pivoting said frame member and vertically adjusting said beater rotor with respect to said drive shaft.

2. A stalk shredding device as set forth in claim 1 wherein the pivotal mounting of each of said beating elements is offset from the longitudinal central axis of its beating element.

3. A stalk shredding device as set forth in claim 1 wherein the pivotal mounting of each of said beating elements is offset from the longitudinal central axis of its beating element in a direction towards the trailing edge of said element.

4. A stalk shredding device of the type for attachment to a vehicle and driven by a power take off unit thereon comprising a supporting member adapted to be rigidly connected at one end thereof to the vehicle, a substantially horizontal drive shaft rotatably supported by said supporting member, said drive shaft adapted to be rotated by the power take off unit of the vehicle, a frame member pivotally journalled on said drive shaft and including two substantially parallel spaced apart side members extending rearwardly from said shaft, a beater rotor rotatably supported by said frame member between its side members and having an axis of rotation substantially parallel to said drive shaft, a plurality of rigid beating elements each pivotally mounted at one end thereof to said beater rotor on its periphery and having the other ends thereof free, each of said beating elements having a leading and a trailing edge, a guard member supported by said shredding device, said guard member being substantially as wide as said beater rotor and extending from beneath said drive shaft rearwardly and upwardly above and around the upper portion of a periphery described by the free ends of the beater elements during rotation of said beater rotor, an angle iron mounted on said guard member transversely thereto, said angle iron being substantially parallel to and vertically above the axis of rotation of said beater rotor adjacent the periphery described by the free ends of the beater elements during rotation of said beater rotor, said angle iron having a knife-like edge spaced from the free ends of said beater elements, means drivably connecting said drive shaft and said beater rotor, and means connected to said frame member and operatively associated with the vehicle for pivoting said frame member and vertically adjusting said beater rotor with respect to said drive shaft.

5. A stalk shredding device as set forth in claim 4 wherein the pivotal mounting of each of said beating elements is offset from the longitudinal central axis of its beating element.

6. A stalk shredding device as set forth in claim 4 wherein the pivotal mounting of each of said beating elements is offset from the longitudinal central axis of its beating element in a direction towards the trailing edge of said element.

7. In combination a tractor, a supporting member rigidly mounted on and extending laterally from one side of said tractor, a substantially horizontal shaft rotatably supported by said supporting member transverse to the longitudinal axis of said tractor, a frame member including two substantially parallel spaced apart side members extending rearwardly from said shaft and pivotally supported thereby, a beater rotor having an axis of rotation substantially parallel to said shaft, said beater rotor being rotatably supported by said frame member between its side members, a plurality of rigid beating elements each pivotally mounted at one end thereof to said beater rotor about its periphery and having the other ends thereof free, each of said beating elements having a leading and a trailing edge, an angle iron mounted above said beater rotor and adjacent a periphery described by the free ends of the beating elements during rotation of said beater rotor, said angle iron extending transversely of said frame and having a knife edge spaced from the free ends of said beating elements, a power take off unit mounted on said tractor, means drivably connecting said power take off unit with said shaft, means drivably connecting said shaft to said rotor beater, and means mounted on said tractor and operatively connected to said frame member for pivoting said frame member and adjusting the height of said beater rotor.

8. The combination as set forth in claim 7 wherein the pivotal mounting of each of said beating elements is offset from the longitudinal central axis of its beating element.

9. The combination as set forth in claim 7 wherein the pivotal mounting of each of said beating elements is offset from the longitudinal central axis of its beating element in a direction towards the trailing edge of said element.

10. The combination as set forth in claim 7 including a guard member connected at its forward end to said supporting member and at its rearward end to said frame member, said guard member extending downwardly from its connection to said supporting member and rearwardly therefrom beneath said shaft and upwardly above and around the upper portion of the periphery described by the free ends of the beating elements during rotation of said beater rotor.

WALTER E. HINES.

References Cited in the file of this patent

UNITED STATES PATENTS

| Number | Name | Date |
|---|---|---|
| 2,302,973 | Sargent | Nov. 24, 1942 |
| 2,484,802 | Aasland | Oct. 18, 1949 |
| 2,505,089 | Bailey et al. | Apr. 25, 1950 |
| 2,509,163 | Musselman | May 23, 1950 |
| 2,531,732 | Hoffman | Nov. 28, 1950 |
| 2,556,446 | Roach | June 12, 1951 |
| 2,585,296 | Bennett et al. | Feb. 12, 1952 |